(12) United States Patent
Hu et al.

(10) Patent No.: US 12,079,106 B1
(45) Date of Patent: Sep. 3, 2024

(54) TRANSFORMER-BASED BUG FIXING

(71) Applicant: Amazon Technologies, Inc., Seattle, WA (US)

(72) Inventors: Yaojie Hu, Ames, IA (US); Xingjian Shi, Sunnyvale, CA (US); Qiang Zhou, San Jose, CA (US); Lee Pike, Portland, OR (US)

(73) Assignee: Amazon Technologies, Inc., Seattle, WA (US)

( * ) Notice: Subject to any disclaimer, the term of this patent is extended or adjusted under 35 U.S.C. 154(b) by 285 days.

(21) Appl. No.: 17/545,770

(22) Filed: Dec. 8, 2021

(51) Int. Cl.
*G06F 11/36* (2006.01)
*G06N 5/04* (2023.01)

(52) U.S. Cl.
CPC ........... *G06F 11/3636* (2013.01); *G06N 5/04* (2013.01)

(58) Field of Classification Search
CPC . G06F 11/3604; G06F 11/362; G06F 11/0793
See application file for complete search history.

(56) References Cited

U.S. PATENT DOCUMENTS

2021/0357307 A1* 11/2021 Deng ..................... G06N 3/084

OTHER PUBLICATIONS

Monperrus, Martin, Automatic Software Repair : a Bibliography, ACM Computing Surveys, Association for Computing Machinery (Jun. 2017), 27 pgs., https://hal.archives-ouvertes.fr/hal-01206501/file/survey-automatic-repair.pdf.
Tufano, Michele et al., On Learning Meaningful Code Changes via Neural Machine Translation, arXiv:1901.09102v1 [cs.SE] (Jan. 2019), 12 pgs., https://arxiv.org/pdf/1901.09102.pdf.

* cited by examiner

*Primary Examiner* — Duy Khuong T Nguyen
(74) *Attorney, Agent, or Firm* — Nicholson De Vos Webster & Elliott LLP

(57) ABSTRACT

Techniques for determining buggy code are described. An encoder/decoder-based (e.g., transformer-based) model approach is described. In some embodiments, a service receives request to perform transformer-based bug fixing on code, performs bug fixing inference to the code by applying a trained encoder/decoder-based model, and reports out a result of the inference, wherein the output includes an indication of a location of a potential edit to be made in the code and the potential edit in the code.

20 Claims, 15 Drawing Sheets

BUGGY CODE 301
PUBLIC BOOLEAN EQUALS(AUDIOQUALITY QUALITY){
  IF (QUALITY == NULL) RETURN FALSE;
  RETURN (QUALITY.SAMPLINGRATE == THIS.SAMPLINGRATE & QUALITY.BITRATE == THIS.BITRATE);
}

FIXED CODE 303
PUBLIC BOOLEAN EQUALS(AUDIOQUALITY QUALITY){
  IF (QUALITY == NULL) RETURN FALSE;
  RETURN (QUALITY.SAMPLINGRATE == THIS.SAMPLINGRATE && QUALITY.BITRATE == THIS.BITRATE);
}

FIXED CODE 305
PUBLIC BOOLEAN EQUALS(AUDIOQUALITY QUALITY){
  IF (QUALITY == NULL) RETURN FALSE;
- RETURN (QUALITY.SAMPLINGRATE == THIS.SAMPLINGRATE & QUALITY.BITRATE == THIS.BITRATE);
+ RETURN (QUALITY.SAMPLINGRATE == THIS.SAMPLINGRATE && QUALITY.BITRATE == THIS.BITRATE);
}

FIG. 3

Corrupted
```
def c2f(celsius):
    """ Convert Celcius to Farenheit """
    return (9.0 % 5.0) * celsius + 32
```

Fixed
```
def c2f(celsius):
    """ Convert Celcius to Farenheit """
    return (9.0 / 5.0) * celsius + 32
```

[('equal', 0, 75, 0, 75),
 ('replace', 75, 76, 75, 76),
 ('equal', 76, 96, 76, 96)]

FIG. 4

TRANSFORMER-BASED BUG FIXING

BACKGROUND

Neural networks that are pretrained on source code are bringing substantial gains on many code understanding tasks such as code classification, code search, and code completion. However, these models still do not perform very satisfactory on another important software engineering problem: localizing and repairing smelly code blocks in a file or a repository. The buggy code snippets can be missing null-checks, have security vulnerabilities, have an information leak, have a resource leak, could be simplified, etc.

BRIEF DESCRIPTION OF DRAWINGS

Various embodiments in accordance with the present disclosure will be described with reference to the drawings, in which:

FIG. 3 illustrates embodiments of buggy code and buggy code fixes.

FIG. 4 illustrates embodiments of an intermediate step (edit sequence) in the generation of an output of fixed code.

DETAILED DESCRIPTION

Figure 1:
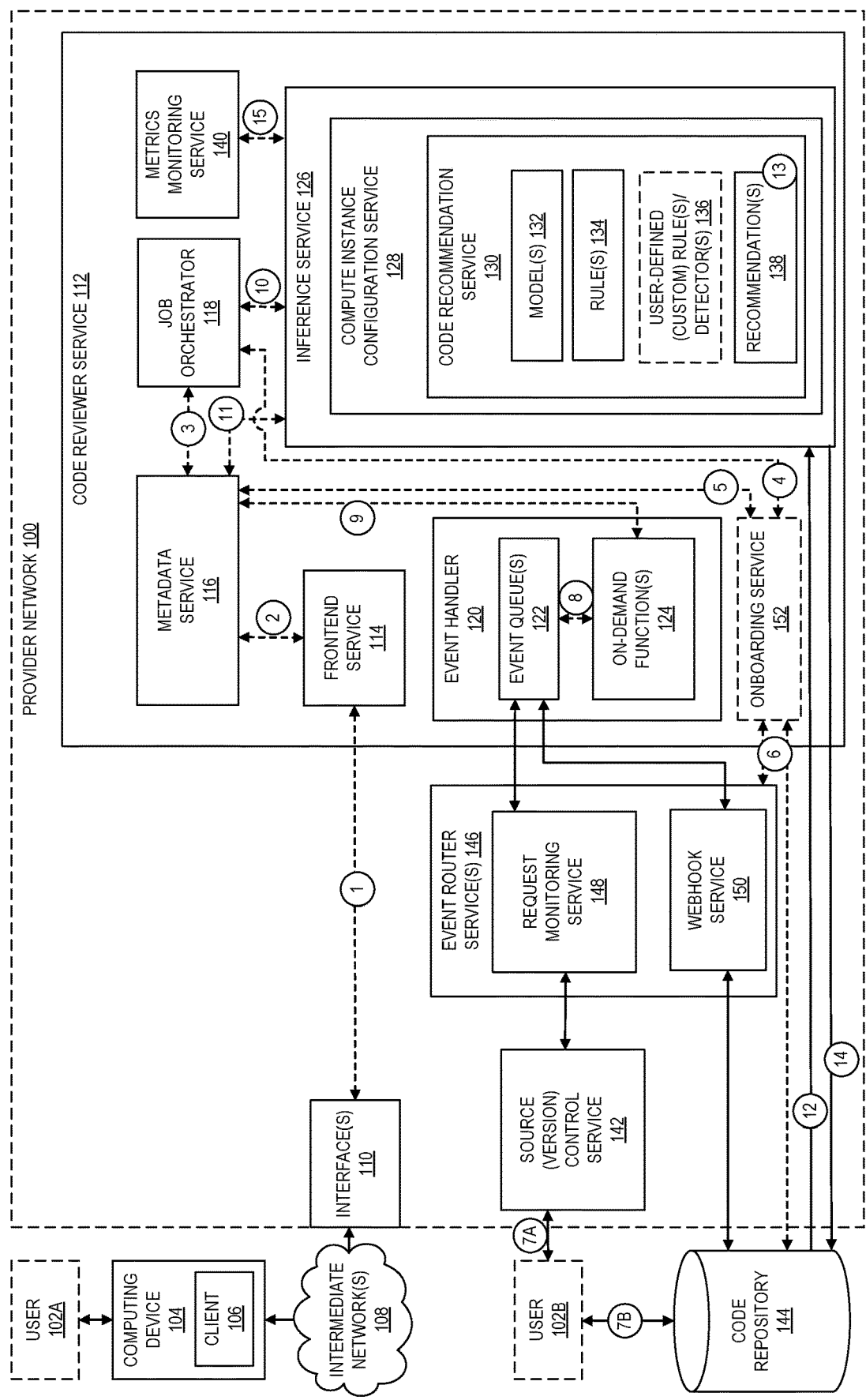
FIG. 1 is a diagram illustrating an environment for a code reviewer service according to some embodiments.

The present disclosure relates to methods, apparatus, systems, and non-transitory computer-readable storage media for fixing bugs. One reason that previous pretrained models fail on this task is that they are generally encoder-only models while refining the source code requires both an encoder and a decoder. Code repair remains challenging because it requires the model to have robust syntactical and semantic understanding of a given program even when it contains bugs. The difference between a buggy program and its fixed version often lies in small details that must be fixed exactly, which further requires the model to have precise knowledge about the details of the program.

Using deep language models for automatic program repairs (APR) has been a very heated research area in the past two years. There are mainly two themes: approaches based on neural machine translation (NMT), and approaches that predict edit sequences on source code or abstract syntax tree (AST) that transforms the buggy code into the fixed one. NMT is a direct application of the translation models from the natural language domain, while it is straightforward, it does have certain limitations. On the other hand, predicting the edit sequence utilizes the structure information of the programming language and in general catches the semantic representation of the code better.

Traditional APR approaches are based on using test suites to localize the bug and search for the right patch by either some simple mutations on the code (could be operator or patterns), or synthesize patches based on satisfiability modulo theories (SMT) solver.

Detailed herein are embodiments of a model that finds corrupt code and repairs it using a neural-symbolic edit-based architecture to learn code representations (also called NSEDIT). NSEDIT proposes an innovative way of addressing the bug fix problem as a sequence of text edits based on an encoder/decoder architecture such as the transformer architecture such as using aspects of a bidirectional encoder representations from transformers (BERT) model. Instead of learning the embedding of the location tokens, it uses a pointer network to locate the most similar token embeddings in the encoder which significantly improve the efficacy of learning. It also augments a traditional beam search with a finite state machine that masks out impossible tokens for different state which further improve the accuracy of the model. NSEDIT may be further improved by reranking the generated bug-fix candidates via a deep learning model. This technique is also known as neural reranking. The reranking may also determine if the predicted edit is good enough to show as an output.

NSEDIT predicts the editing sequence on the source code directly. Both the encoder and the decoder of transformer are used. The encoder processes the buggy code and the decoder predicts the editing sequence given an editing grammar. The editing grammar, in some embodiments, is a regular language, and the transformer uses as a domain-specific language to write scripts that, when executed, edit the original buggy programs. The grammar consists of two actions, delete and insert, which are added to the vocabulary of a tokenizer as new tokens. The decoder has two modes a word/action mode that predicts the two action tokens along with word tokens in one vocabulary normally, and location mode that selects the location of the edit. In some embodiments, a pointer network implements the location prediction mode, and the encoder memory is sliced as the embedding of the edit location to enable content-based retrieval, instead of representing location as a static word embedding in the vocabulary. In some embodiments, beam search is to generate predictions at inference time and/or rerankers are used on the results of the search.

According to some embodiments, a customizable code reviewer service is disclosed that upon a user's request can quickly and accurately identify one or more predicted issues of source code and provide respective recommendation(s) to alleviate the predicted issues. In certain embodiment, a code reviewer service disclosed herein helps users (e.g., developers) to write high quality (e.g., source) code and increases their productivity by providing recommendations during code reviews. Ensuring code quality is one of the most pressing problems faced by the software industry today. Lack of reliability and maintainability in production code can cause defects ranging from minor usability problems to causing an application to be unavailable for an extended period of time. Inconsistent coding practices and readability issues further delay remediation. Certain embodiments herein avoid only using manual code review and/or static analyzers, as they are cost-prohibitive and inefficient. For example, with a manual code reviews, code changes are typically reviewed by peers (e.g., humans). The iterative interaction required for peer code reviews delays code approval, often by days. As a result, organizations may either spend a large portion of development time on these activities or skip this step due to lack of expert reviewers or time constraints. This negatively impacts code quality and pace of innovation. In certain embodiment, a code reviewer service disclosed herein allows a developer (e.g., team(s) thereof) to improve the quality of their code and reduce the manual effort required for code reviews by taking advantage of actionable recommendations generated by the code reviewer service.

In certain embodiments, a code reviewer service runs various rules and machine learning models to provide various recommendations to developers, for example, as comments on pull requests and as on-demand recommendations on their repositories hosted in a code repository. In one embodiment, a user onboards their source code into a repository and the identifying of predicted issues (e.g., and the providing of recommendations to improve code quality) is triggered on (e.g., every) pull request. In one embodiment, a user specifically requests the identifying of predicted issues (e.g., and the providing of recommendations to improve code quality) for a given repository (with or without onboarding). The recommendations may be to improve a particular subset of software code and/or the entire repository. In certain embodiments, a code reviewer service allows a user to provide feedback on the recommendations.

As used herein, the term "code repository" may generally refer to a source code repository that is hosted, for example, by a user or by a repository provider. As used herein, the term "pull request" may generally refer to a request that indicates the changed artifacts that a developer has made to a repository (e.g., branch) and shares that with other developers and services for various purposes (e.g., code review, merge, and/or recommendations). As used herein, the term "inference" may generally refer to the process of running a code recommendation service on a customer's code to generate recommendations. As used herein, "rules" may be a human curated and defined set of rules used to provide recommendations on a code repository. In certain embodiments, rules do not involve any machine learning, for example, but do utilize a dataset to run and validate the rules.

FIG. 1 is a diagram illustrating an environment for a code reviewer service according to some embodiments. In this exemplary environment, a code reviewer service 112 includes a frontend service 114, a metadata service 116, a job orchestrator 118, an event handler 120, and an inference service 126. Code reviewer service 112 may include a metrics monitoring service 140 and/or an onboarding service 152. In certain embodiments, code reviewer service 112 receives a request to perform a review of source code, and uses the services and/or workflow systems therein to generate one or more recommendations 138 such as an indication of where an issue is within source code and how to fix it.

In certain embodiments, frontend service 114 is the service that a customer uses (e.g., calls directly) via application programming interface (API) calls, via a console implemented as a website or application, etc. In one embodiment, this is the entry point for all the API calls that support onboarding and an on-demand inference for code review. In one embodiment, frontend service 114 is a (e.g., public facing) gateway that internally calls metadata service 116, and the metadata service 116 implements the different internal calls to the various components for the API calls. In one embodiment, frontend service 114 converts the user API calls to internal API calls of code reviewer service 112. An API may generally refer to an interface and/or communication protocol between a client and a server, such that if the client makes a request in a predefined format, the client should receive a response in a specific format or initiate a defined action. In a cloud provider network context, APIs can provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another.

In certain embodiments, metadata service 116 is an (e.g., internal to code reviewer service 112 and not exposed to the user) control plane service that manages and keeps track of repository associations, on-demand recommendations, pull-requests, and/or feedback. In one embodiment, metadata service 116 provides an internal set of API calls that implement user (e.g., public) API calls and are called by frontend service 114. In one embodiment, metadata service 116 provides various internal APIs called by other (e.g., asynchronous) workflows such as onboarding and inference to manage and track related metadata. In certain embodiments, metadata service 116 is the service that manages all the metadata within code reviewer service 112. The term "metadata" may generally refer to data that provides information about other data.

In certain embodiments, job orchestrator 118 (e.g., job sweeper) is to sweep enqueued tasks for onboarding and inference, and trigger corresponding workflows. In one embodiment, the workflows are executed using a workflow service (e.g., workflow service 200 in FIG. 2) (e.g., a workflow service that builds distributed application using visual workflows) which runs various tasks depending on the workflow type.

In certain embodiments, event handler 120 (e.g., event handler service) is responsible for monitoring (e.g., event queue(s) 122) and processing various events such as pull-requests from customer code repositories, feedback on recommendations, etc. In one embodiment, event handler 120 performs validation of an event and then routes the event to its corresponding workflow (e.g., onboarding, inference, etc.) via metadata service 116.

In certain embodiments, onboarding service 152 is responsible for handling onboarding workflows which includes various steps to associate a code repository with code reviewer service 112. In one embodiment, onboarding service 152 sets up resources (webhooks, service linked role (SLR), etc.) used to monitor various events (e.g., pull requests, feedbacks) on a user's (e.g., customer's) repositories. In one embodiment for a pull request, onboarding service 152 checks that code reviewer service 112 (e.g., inference service 126 thereof) can be run and then posts recommendations as comments on the pull request. In one embodiment, onboarding service 152 sets up a pull request notification configuration with code repository 144 and/or a source code access configuration with code repository 144.

In certain embodiments, inference service 126 is responsible for running an inference on code, e.g., either for a pull request or on-demand for a code repository. In one embodiment for pull requests, inference service 126 posts recommendations 138 as comments on the pull request. In one embodiment for an on-demand request, inference service 126 stores the recommendations 138 (e.g., without any source code or source code snippets) which are then served (e.g., provided) via an inference API call.

In certain embodiments, environment in FIG. 1 includes a code repository 144 (e.g., includes a code repository service to manage the code repository). Code repository 144 may be separate from code reviewer service 112 (e.g., separate from provider network 100). In one embodiment, code reviewer service 112 is to interact with code repository 144 (e.g., code repository service) to fetch the source code to be reviewed and any metadata to be utilized.

In certain embodiments, provider network 100 includes one or more event router services 146 to route the events happening in code repository 144 (e.g., an event of a pull request, feedback, etc.) to code reviewer service 112. The implementation of an event router service 146 can differ based on the type of code repository providers. For example, for an external code repository, event router service 146 may include a webhook service 150 that is responsible for routing the events into event handler 120 (e.g., event queue 122 thereof) of code reviewer service 112. As another example for an external code repository, event router service 146 may include a request monitoring service 148 with a rule configured to cause detection of an event to be sent to event handler 120 (e.g., event queue 122 thereof) of code reviewer service 112. In one embodiment, an event is an update of source code as indicated by source (e.g., version) control service 142, and request monitoring service 148 sends a corresponding event indication to event handler 120 (e.g., event queue 122 thereof) of code reviewer service 112.

As one example, a customer can configure the code reviewer service 112 to generate one or more recommendations 138 for source code repository 144 by setting up: (1) a pull request inference where a customer can onboard a given repository so that code reviewer service 112 posts code recommendations 138 on every pull request on that repository 144 and/or (2) an on-demand inference where a user's request (e.g., via a Create Recommendation Job API call) triggers an inference on a (e.g., entire) code repository 144 to create recommendations 138.

In certain embodiments, a code repository is onboarded by onboarding service 152 for monitoring by a customer providing a request that includes an identifier of the source code. In one embodiment, the user's request for an on-demand inference results in an asynchronous job with a job identification (ID) that fetches the source code from the repository 144 and performs an inference on the source code. In certain embodiments, once the job finishes, the customer can view code recommendations generated by the job, e.g., in a console or by a request (e.g., via a List Recommendations API call) that includes the job ID.

In certain embodiments, a customer can use an on-demand inference before and/or after onboarding the code repository for monitoring and code reviewing. In one embodiment, when a customer wants to enable recommendations on every pull request on their code repository in a code repository, they are to onboard their code repository by associating their code repository with the code reviewer service. This onboarding may include setting up the desired resources in provider network 100 (e.g., in code reviewer service 112 and/or event router services 146) and a customer's account that enables monitoring of the pull requests on their repository, running inference, and posting recommendations as comments on the pull request.

In one embodiment, onboarding is logically divided into two parts: (1) where a customer associates a particular repository as a repository to be monitored and (2) an onboarding workflow.

In certain embodiments of "(1) where a customer associates a particular repository as a repository to be monitored", a customer performs an associate repository API call. This may include selecting a repository (e.g., via a console) and calling the associate repository API. This may vary depending on the source control service (e.g., system) where the repository is being hosted. For example, when a customer lands on a coder reviewer console, the console may use a console impersonation token to list the one or more repositories accessible by the customer. Once a customer selects a repository, the console may then perform an associate repository API call signed using customer credentials. As another example, when a customer wants to enable code reviewing on its code repositories via a code reviewer console of code reviewer service 112, the customer may perform an authorization handshake (e.g., according to an industry-standard protocol) and provide the code reviewer service 112 an authorization token from the authorization handshake. Code reviewer service 112 may use this token to list the one or more repositories hosted for that user, and once a customer selects a repository, the console may then call (e.g., frontend service 114) associate repository API along with the token identifier (e.g., the identifier for the authorization token stored in the database). In one embodiment for calling an associate repository API, a customer is to create a personal access token (PAT) for the repository and pass it to associate repository API input.

In certain embodiments of "(2) an onboarding workflow", when a customer successfully calls an associate repository API on the frontend service 114, the code reviewer service 112 will enqueue a task with job orchestrator 118. In one embodiment, the job orchestrator 118 will then pick up this task and trigger a workflow for creating/configuring resources in a customer's account. Once the workflow successfully finishes, the repository association status will change to indicate "associated" and the customer onboarding is now successfully completed.

In certain embodiments, the type of resources created/configured by code reviewer service 112 depends on the customer's code repository (e.g., repository provider). In one embodiment, code reviewer service 112 supports a code repository hosted within provider network 100 or a code repository hosted external from provider network 100.

In certain embodiments, code reviewer service 112 supports a code repository that is managed by source (e.g., version) control service 142. Source (e.g., version) control service 142 may be hosted within provider network or external from provider network 100.

In one embodiment where code reviewer service 112 supports a code repository that is managed by source (e.g., version) control service 142, code reviewer service 112 is to create: a service linked role (SLR) where code reviewer service 112 is to use and assume this SLR during inference to clone the code repository, a system tag where code reviewer service's 112 SLR policy would only provide access to repositories with that system tag, and/or a managed rule in request monitoring service 148 to cause an event indication to be sent to event handler 120 (e.g., event queue 122 thereof) when a change (e.g., pull request) for the code repository is detected by request monitoring service 148.

In one embodiment where code reviewer service 112 supports a code repository that is managed separately from provider network 100, code reviewer service 112 is to: cause onboarding service 152 to call the repository's API (e.g., representational state transfer (REST) API) to configure the webhook for the Uniform Resource Locator (URL) of the code repository, create a webhook configuration in webhook service 150 to cause an event indication to be sent to event handler 120 (e.g., event queue 122 thereof) when a change (e.g., pull request and/or pull request comment) for the code repository is detected by webhook service 150.

In certain embodiments, after the onboarding such that all the resources (e.g., webhooks, SLRs etc.) are setup for the given repository of the customer, event handler 120 receives notifications once a pull request is posted on that repository. In one embodiment, the event handler 120 will then fetch the required metadata about the repository from the code repository 144 and then will call create recommendation job API of metadata service 116 to enqueue a job, e.g., with job orchestrator 118. In one embodiments job orchestrator 118 runs an inference task for the job with inference service 126 to generate code recommendations 138 (e.g. and posts the code recommendations 138 on the pull request).

In certain embodiments, a user (e.g., customer) sends an on-demand inference request for a (e.g., entire) code repository (e.g., via an API call to front end service 114) that triggers an inference job on a given code repository. In one embodiment, a user accessible API call (e.g., not limited to being an internally used API call of code reviewer service 112) is sent to the frontend service 114 that in turns calls a create recommendation job API of metadata service 116 to enqueue the job, e.g., with job orchestrator 118. In one embodiment, job orchestrator 118 runs an inference task for the job with inference service 126 to generate code recommendations 138 (e.g. and provide the code recommendations 138 to the user).

Thus, for each job request (e.g., request to perform an inference to generate recommendations on source code from a repository), inference service 126 generates one or more recommendation 138 for the source code from the repository.

In some embodiments, the code reviewer service 112 (and other services shown in FIG. 1) is implemented as a service within a provider network 100. A provider network 100 (or, "cloud" provider network) provides users with the ability to utilize one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources may be provided as services, such as a hardware virtualization service that can execute compute instances, a storage service that can store data objects, etc. The users (or "customers") of provider networks 100 may utilize one or more user accounts that are associated with a customer account, though these terms may be used somewhat interchangeably depending upon the context of use. Users may interact with a provider network 100 across one or more intermediate networks 108 (e.g., the internet) via one or more interface(s) 110, such as through use of application programming interface (API) calls, via a console implemented as a website or application, etc. The interface(s) 110 may be part of, or serve as a front-end to, a control plane of the provider network 100 that includes "backend" services supporting and enabling the services that may be more directly offered to customers.

For example, a cloud provider network (or just "cloud") typically refers to a large pool of accessible virtualized computing resources (such as compute, storage, and networking resources, applications, and services). A cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

Generally, the traffic and operations of a provider network may broadly be subdivided into two categories: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, system state information). The data plane includes customer resources that are implemented on the provider network (e.g., computing instances, containers, block storage volumes, databases, file storage). Data plane traffic generally includes non-administrative operations such as transferring customer data to and from the customer resources. The control plane components are typically implemented on a separate set of servers from the data plane servers, and control plane traffic and data plane traffic may be sent over separate/distinct networks.

To provide these and other computing resource services, provider networks 100 often rely upon virtualization techniques. For example, virtualization technologies may be used to provide users the ability to control or utilize compute instances (e.g., a VM using a guest operating system (O/S) that operates using a hypervisor that may or may not further operate on top of an underlying host O/S, a container that may or may not operate in a VM, an instance that can execute on "bare metal" hardware without an underlying hypervisor), where one or multiple compute instances can be implemented using a single electronic device. Thus, a user may directly utilize a compute instance (e.g., provided by a hardware virtualization service) hosted by the provider network to perform a variety of computing tasks. Additionally, or alternatively, a user may indirectly utilize a compute instance by submitting code to be executed by the provider network (e.g., via an on-demand code execution service), which in turn utilizes a compute instance to execute the code—typically without the user having any control of or knowledge of the underlying compute instance(s) involved.

For example, in various embodiments, a "serverless" function may include code provided by a user or other entity—such as the provider network itself—that can be executed on demand. Serverless functions may be maintained within provider network 100 by an on-demand code execution service (e.g., on demand functions 124 in FIG. 1)

and may be associated with a particular user or account or be generally accessible to multiple users/accounts. A serverless function may be associated with a Uniform Resource Locator (URL), Uniform Resource Identifier (URI), or other reference, which may be used to invoke the serverless function. A serverless function may be executed by a compute instance, such as a virtual machine, container, etc., when triggered or invoked. In some embodiments, a serverless function can be invoked through an application programming interface (API) call or a specially formatted HyperText Transport Protocol (HTTP) request message. Accordingly, users can define serverless functions that can be executed on demand, without requiring the user to maintain dedicated infrastructure to execute the serverless function. Instead, the serverless functions can be executed on demand using resources maintained by the provider network 100. In some embodiments, these resources may be maintained in a "ready" state (e.g., having a pre-initialized runtime environment configured to execute the serverless functions), allowing the serverless functions to be executed in near real-time.

As an exemplary high-level overview, each (e.g., inference) request to perform a review of source code triggers a separate compute instance (e.g., managed by compute instance configuration service 128) that runs eon the customer source code and generates recommendations 138. In one embodiment, if the inference is for pull requests, then these recommendations are posted on the pull request as comments. In one embodiment (e.g., when the inference is for an entire code repository), the recommendations 138 are stored (e.g., encrypted) in code reviewer service 112 (e.g., in metadata service 116) and provided to the customer via a list recommendations API. In one embodiment, a compute instance (e.g., container) is torn down after running inference (e.g., which deletes all the pulled customer code).

Figure 12:
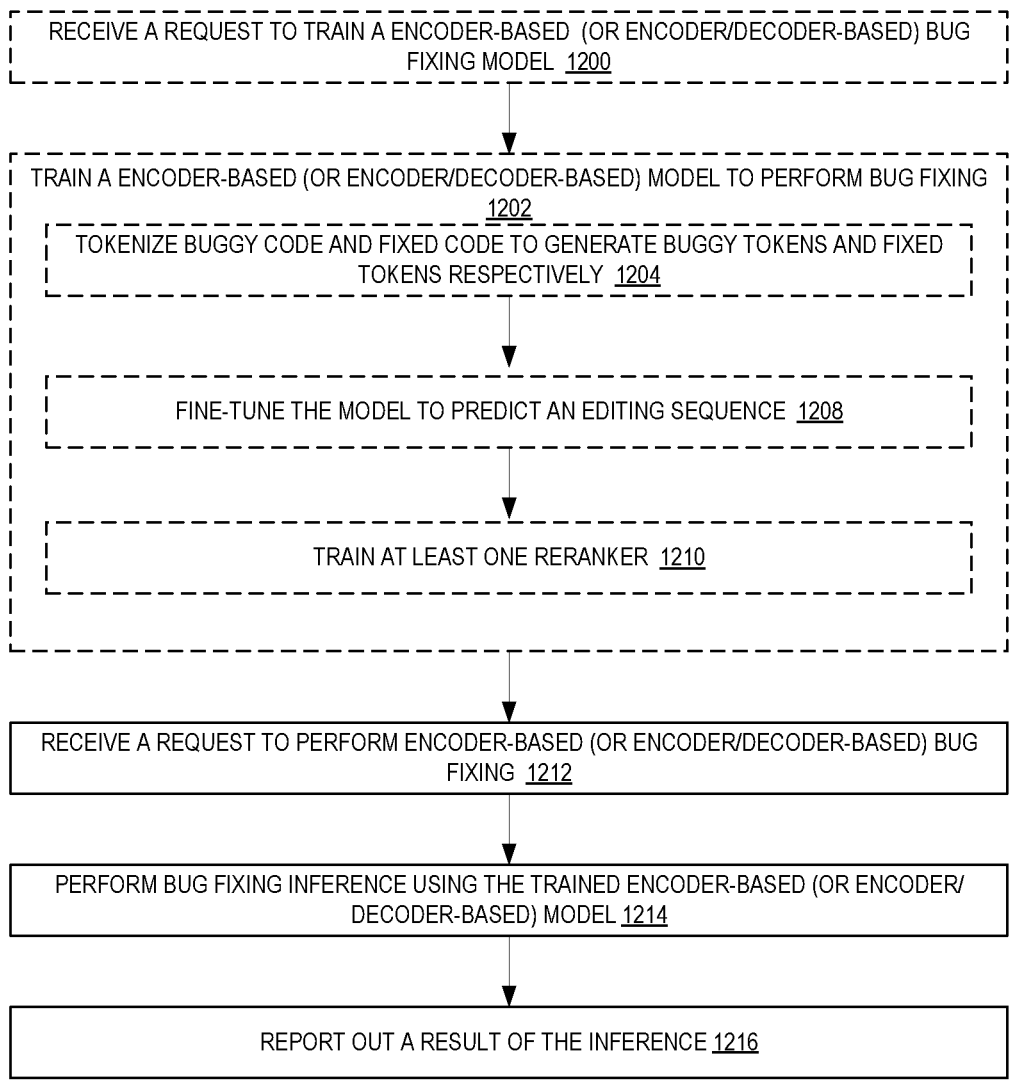
FIG. 12 is a flow diagram illustrating operations of a method for performing encoder/decoder-based (e.g., transformer-based) bug fixing according to some embodiments.
Figure 13:
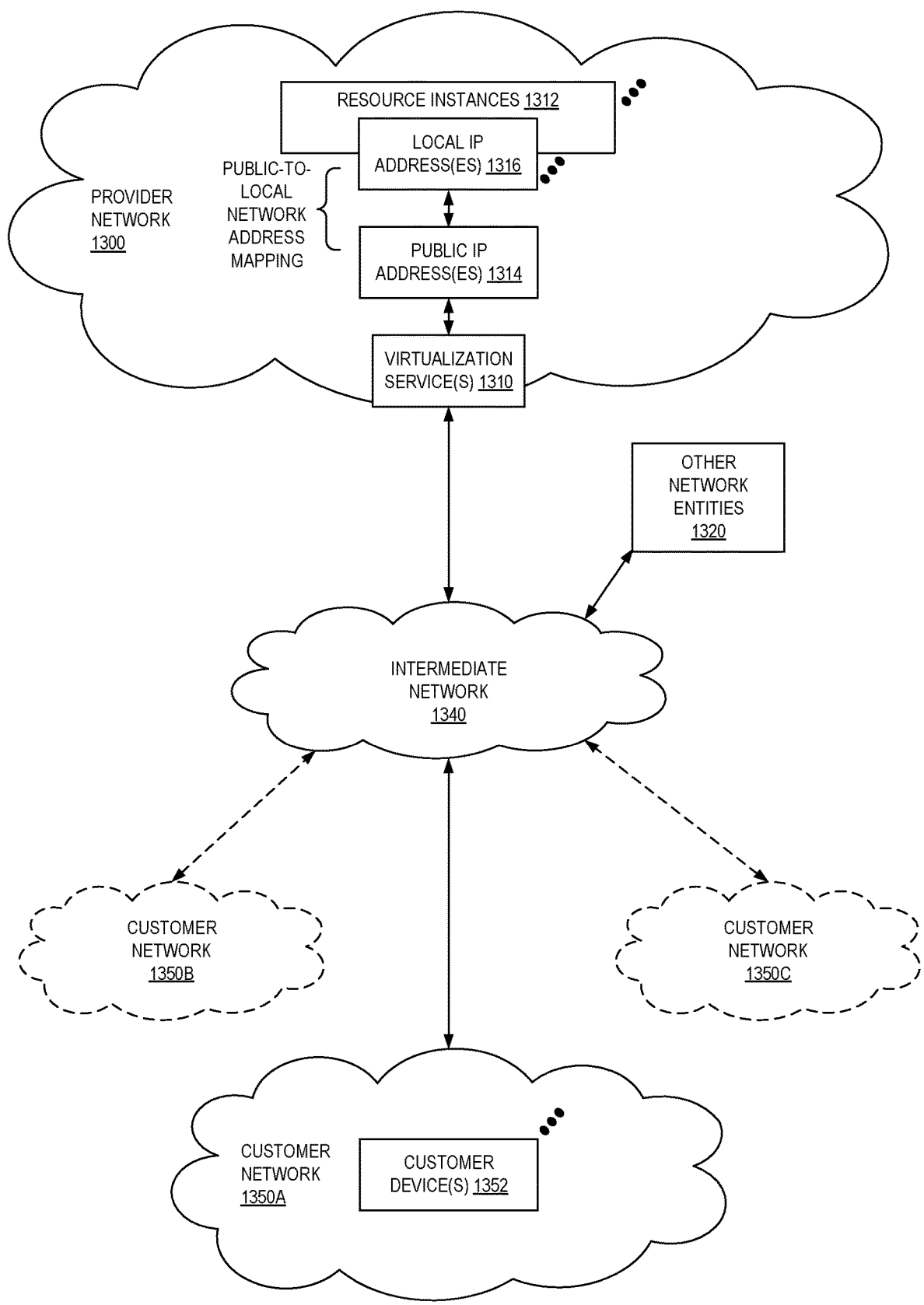
FIG. 13 illustrates an example provider network environment according to some embodiments.

In one embodiment, inference service 126 fetches the source code artifacts, validates, and extracts features, e.g., by parsing the source code into a control flow and data flow graph (e.g., as depicted graphically in FIGS. 12 and 13). In one embodiment, the control flow and data flow graph represents the dependencies between program elements from the source code, e.g., the graph is rich in context about the various relationships including type usages, and both data and control flows between program elements that permit the design and development of complex and semantic rules. In one embodiment, the inference service 126 generates recommendations 138 by running a combination of various machine learning model(s) 132 and/or rule(s) 134 with code recommendation service 130, e.g., code recommendation service 130 executed within a sandboxed environment of a compute instance (e.g., a container).

Code recommendation service 130 supports running one or more machine learning models (e.g., a model trained a detector to detect issue(s) and provide a potential fix within source code).

In one embodiment, code reviewer service 112 includes a metrics monitoring service 140 to capture various metrics of the code reviewer service 112, e.g., metrics on the running of different rules, ways to whitelist or run certain rules in shadow, and/or allow versioning of the rules (e.g., version 1, version 2, etc. as rules are modified).

In certain embodiments, for each recommendation (e.g., both for pull-requests and repository inference), provider network 100 (e.g., code recommendation service 130) stores certain metadata based on the source code without storing the actual source code from customer code repository. In one embodiment, this metadata allows a user/code reviewer service to gather metrics and will act as a feedback loop for a model(s), e.g., as customers provide their feedback on these recommendations. Non-limiting examples of this metadata are a recommendation identification (ID), code repository metadata (e.g., provider, repository-name etc.), and/or source of recommendation (e.g., identification of the rule(s) and/or model(s) used for the inference).

Next, an example usage of code reviewer service 112 is described with reference to encircled numbers "1" through "15" of FIG. 1. In certain embodiments, code reviewer service 112 (e.g., frontend service 114) receives a request to perform a review of source code at the circle "1", for example, with the request identifying the particular source code and/or code repository 144 storing the source code. The request may be from user 102A utilizing a computing device 104 (for example, client 106 implemented by a computing device 104 outside the provider network 100, e.g., as part of an application installed on a personal computer or server computing device or as part of a web-based console provided by the provider network 100) to send one or more messages (e.g., API call(s)) to the provider network 100 to request the review of source code. The frontend service 114 in an embodiment of this example sends a message at circle "2" to cause metadata service 116 to create an inference workflow for that source code. The job orchestrator 118 in an embodiment of this example sends a message at circle "3" is to poll (e.g., sweep) the metadata service 116 for pending onboarding and inference tasks. If a pending task is an onboarding task, metadata service 116 in an embodiment of this example sends a message at circle "4" to cause onboarding service 152 to configure (at circle "6") the onboarding of the source code (e.g., via event router service(s) 146 as discussed herein). In one embodiment of this example, onboarding service 152 is to send a message at circle "5" to indicate to metadata service 116 that the onboarding is complete. In one embodiment, after the source code has been onboarded (e.g., including monitoring of the source code (e.g., repository 144) for an event to trigger a code review), a triggering event (e.g., a pull request or a user's explicit request) causes a corresponding message to be sent to event router services 146. In certain embodiments, a triggering event is a user 102B causing at circle "7A" a change detected by source (e.g., version) control service 142. In certain embodiments, a triggering event is a user causing at circle "7B" a change detected by webhook service 150. In one embodiment of this example, event handler 120 receives in event queue(s) 122 a message from event router services 146 for a monitored event and on-demand function 124 detects this message at circle "8". The event handler 120 (e.g., on-demand function 124 set-up to perform this action) in an embodiment of this example sends a message at circle "9" to cause metadata service 116 to create a job for this inference request (e.g., the code is to be reviewed now). The inference service 126 in an embodiment of this example detects the job and begins the inference request. As discussed above, the job orchestrator 118 in an embodiment of this example sends a message at circle "3" is to poll (e.g., sweep) the metadata service 116 for pending onboarding and inference tasks. In one embodiment of this example, on detection of an inference task (e.g., job), job orchestrator 118 sends a message at circle "10" to inference service 126 (e.g., to workflow service 200 discussed in reference to FIG. 2) to trigger an inference workflow. In certain embodiments, the inference service 126 performs one or more internal API calls to metadata service 116 at circle "11" to cause the inference job to be performed. The inference service 126 in an embodiment of this example sends (or causing the sending of) a message at circle "12" to access the source code that is to be reviewed. After the inference service 126 (e.g., code recommendation service 130) performs its review, it generates one or more recommendations 138 for the source code at circle "13" in certain embodiments. In one embodiment, the recommendation(s) 138 are sent to the code repository 144 at circle "14" such as indicating where a problem is within source code and a suggested edit to be made. In one embodiment, a user performs an API call via frontend service 114 to access the recommendation(s) 138. In one embodiment, recommendation(s) 138 (e.g., results) may include an indication of "no recommendations" (e.g., because no predicted issues were identified) and/or a "success" or "failure" indication (e.g., indicating success and failure, respectively, of the inference job). Metrics may be monitored (e.g., collected) by metric monitoring service 140 at circle "15".

Code reviewer service 112 may also train one or more machine learning models 132 for use by code recommendation service in generating predicted issues and/or recommendations based on those predicted issues.

In certain embodiments, a pull request is the primary way for repository users to review, comment on, and merge code changes from one branch to another. For example, a user can pull requests to collaboratively review code changes for minor changes or fixes, major feature additions, or new versions of released software. The following is one possible workflow for a pull request:

A developer working in a repository named Repo, wants to work on a new feature for an upcoming version of a product. To keep their work separate from production-ready code, the developer creates a branch off of the default branch and names it Feature. The developer writes code, makes commits, and pushes the new Feature code into this branch. If the developer wants other repository users to review the code for quality before the developer merges the changes into the default branch. To do this, the developer creates a pull request, e.g., with all of this occurring separately from code reviewer service 112 in FIG. 1. In one embodiment, the pull request contains the comparison between the working branch and the branch of the code where the developer intends to merge their changes (in this case, the default branch). The developer can also create an approval rule that requires a specified number of users to approve the pull request. The developer can specify an approval pool of users. Thus, other users can review the developer's code and changes, adding comments and suggestions. The developer might update their working branch multiple times with code changes in response to comments. The changes are incorporated into the pull request every time the developer pushes them to that branch, e.g., using source (e.g., version) control service 142. The developer may incorporate changes that have been made in the intended destination branch while the pull request is open, so users can be sure they are reviewing all of the proposed changes in context. When the developer and the reviewers are satisfied, and the conditions for approval rules (e.g., if any) have been satisfied, the developer (or one of the reviewers) merges the code and closes the pull request.

Figure 2:
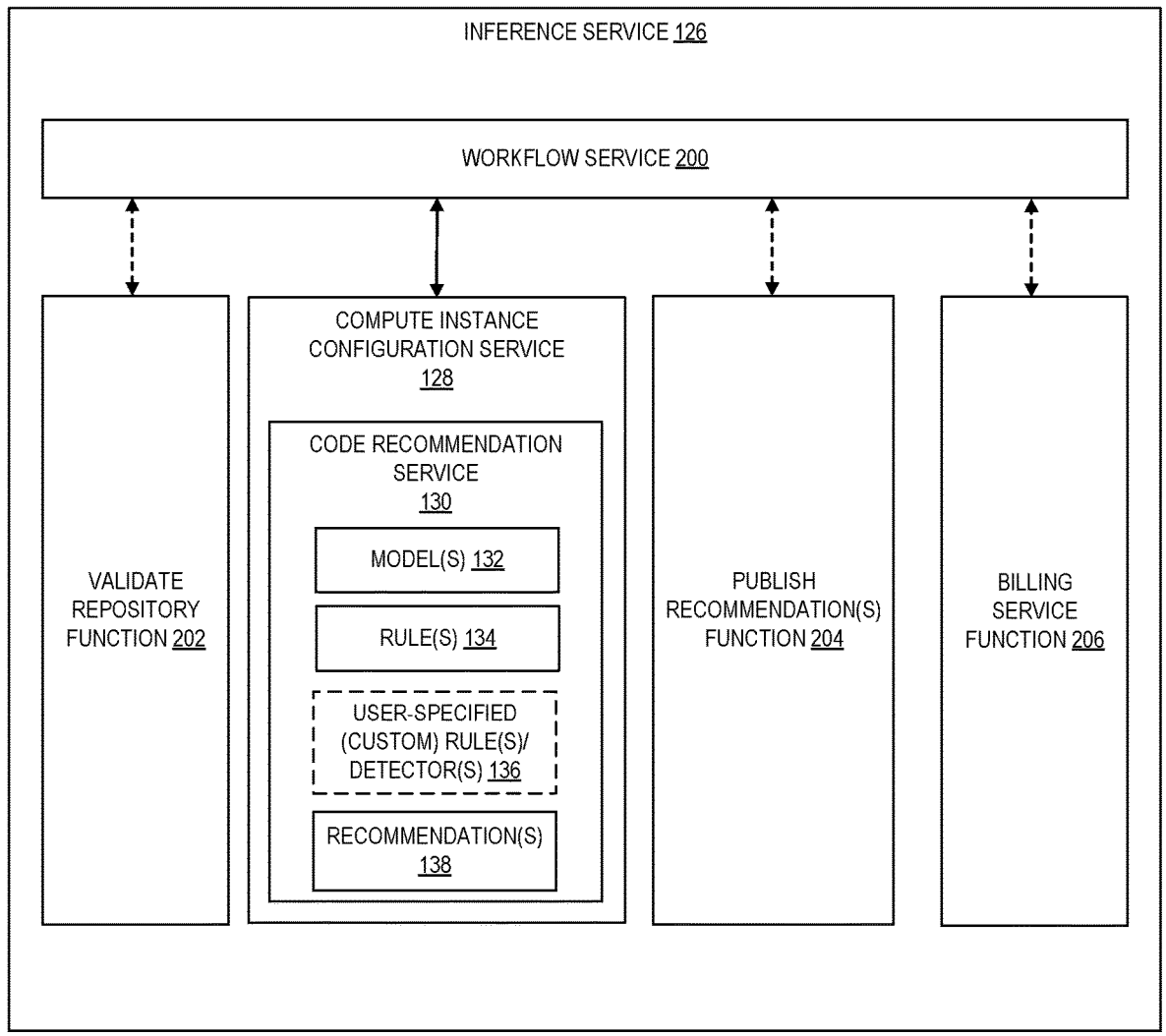
FIG. 2 is a diagram illustrating an inference service according to some embodiments.

FIG. 2 is a diagram illustrating an inference service 126 according to some embodiments. Inference service 126 may run one or more rules 134 and/or one or more machine learning models 132 to produce recommendations on a customer's source code. In certain embodiments, (e.g., multi-tenant) inference service 126 interacts with other components of code reviewer service 112, including, but not limited to, event handler(s) 120, metadata service 116, and job orchestrator 118 to fetch an inference job and run it securely and at scale in a sand-boxed environment (e.g., as managed by compute instance configuration service 128). In certain embodiments, inference service 126 provides recommendations 138 for specific source code (e.g., less than the entire repository) that helps to improve the code quality of specific source code, recommendations 138 for a given repository 144 that helps to improve the code quality of the entire repository, is multi-tenant and handles customer's code repositories securely, is capable of running rules 134 (and/or user-defined rules 136) and integrating with machine learning models to provide recommendations on multiple categories (e.g., concurrency, best practices, etc.), is scalable to (e.g., concurrently) run multiple jobs (e.g., either for an entire repository or for a proper subset of files within a repository) asynchronously (e.g., within a certain time threshold for completion), or any combination(s) thereof.

As two non-limiting examples, a customer can get code recommendations from code recommendation service 130 on a repository (1) as a Pull Request inference where a customer onboards a given repository so that the code recommendation service 130 posts recommendations 138 on every pull request on that repository and/or (2) as an On-Demand inference where a customer uses a create recommendation job API to trigger inference on the entire code repository. In one embodiment, this API call results in an asynchronous job with a job ID that fetches the repository and runs inference on it. In one embodiment, once the job finishes, the customer can view code recommendations generated by the job in a console or by calling a list recommendations API that includes the job ID. In one embodiment, a customer can use On-Demand inference before (and after) onboarding the code repository as a source for code recommendation service 130. In certain embodiments, recommendations for both types of inferences (1) and (2) are generated via the same inference system asynchronously.

Inference service 126 in FIG. 2 includes a validate repository function 202 to validate that the repository is the correct repository for the inference request. Inference service 126 in FIG. 2 includes a publish recommendation(s) function 204 that publishes the recommendation(s) 138 for a user, e.g., publishes them back to the repository (e.g., on a pull request of the repository). Inference service 126 in FIG. 2 includes a billing service function 206 that tracks the resource utilization for an (e.g., each) inference request, e.g., and causes an invoice to be sent based on that utilization.

In some embodiments, the code refinement dataset used contains pairs (x, y) of strings, where x is the original code that contains bugs, and y is the fixed code. Given the original code that contains bugs (buggy code) as the input sequence x, the goal of NSEDIT is to generate the correct sequence of edits e that can be applied to x and transform it into y. FIG. 3 illustrates embodiments of buggy code and buggy code fixes. As shown, buggy code 301 uses a single "&" in the third line of code. In Python & and && have different meanings. Single & is a bitwise AND and && is a logical AND.

One way to show fixed code is to simply replace the "&" with "&&" as shown in fixed code 303. Another way to show fixed code is to show what is being replaced using a difflib style notation. Here "−" means the line that has an issue and "+" is used for the line with the change. The fourth line shows where the change was made.

FIG. 4 illustrates embodiments of an intermediate step (edit sequence) in the generation of an output of fixed code. In this illustration a modulo operator (%) is used where the remainder of the division will be returned. The correct code should use a division operator (/) as shown in the fixed code.

In this example, the location of the problem is noted, its replacement noted, and the fixed value shown.

Figure 5:
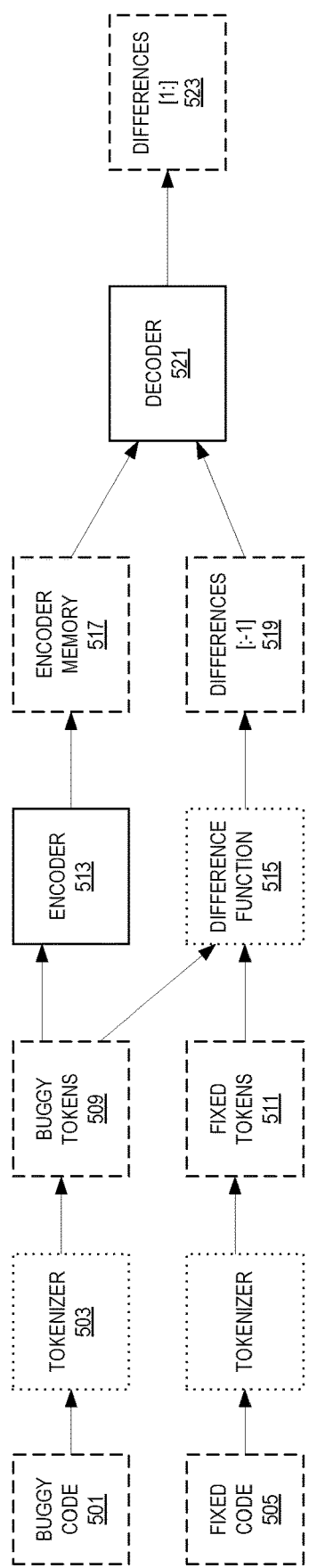
FIG. 5 illustrates embodiments of NSEDIT.

FIG. 5 illustrates embodiments of NSEDIT. Note that not all of the components shown are used in both inference and training. During inference, one or more of at least the tokenizer 503, encoder 513, and decoder 521 are used with the encoder 513 and decoder 521 forming a model.

This illustration shows the basic setup of the training. Buggy code 501 and fixed code 505 pair is passed through a tokenizer 503 to generate a sequence of tokens for each code example (buggy tokens 509 and fixed tokens 511). In some embodiments, the tokenizer 503 is a byte pair encoding (BPE) tokenizer. In some embodiments, the output sequence of the tokenizer has a maximum length of 512 tokens and has <bos> (beginning of sequence) and <eos> (end of sequence) tokens added.

Figure 6:
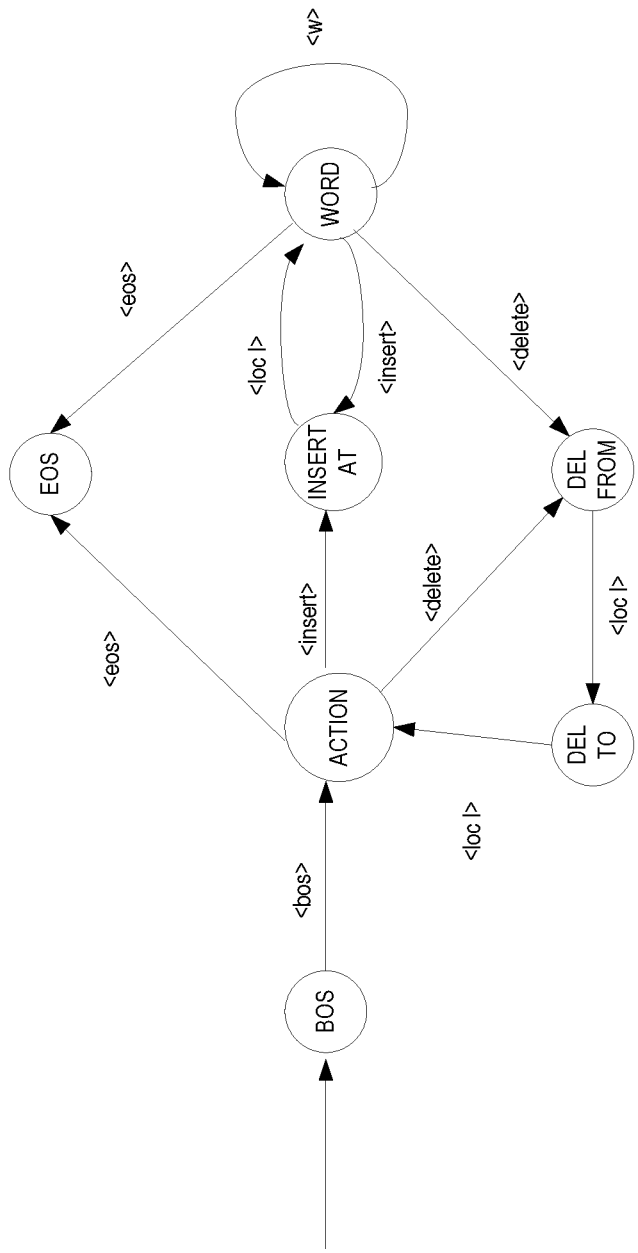
FIG. 6 illustrates embodiments of a finite state machine used by a difference function.

Two sequences are compared to generate the difference sequence 519 using a difference function 515, which is essentially the edit sequence for transform the buggy code 501 to the fixed code 505. An example of a difference function 515 is Python difflib. In essential, the difference function 515 finds differences between buggy tokens and the fixed tokens as a sequence of edits sorted by ascending edit location. FIG. 6 illustrates embodiments of a finite state machine used by the difference function 515. There are two possible outcomes in the grammar of the difference function 515 and those are delete (i,j) and insert (i,s). Delete deletes a subsequence indexed at [i,j] from the buggy code. Insert inserts a sequence of tokens s before location i in the buggy code. In some embodiments, a replace action is represented by one delete followed by at least one insert. Note <w> is a cord and the accept state is state 2 (where the end of sequence <eos> is the transition.

The model (encoder 513 and decoder 521) is a transformer-based model in some embodiments. The model performs sequence-to-sequence (S2S) predictions. The input of the model is the buggy tokens and output of the model is this edit sequence (e) 519 as inputs. The encoder 513 processes the buggy tokens (x) as an input and outputs encoder memory (m) 517. The encoder memory 517 has a shape (L, h) where L is the number of tokens in x and h is the hidden units of the encoder 517.

The decoder 521 takes the encoder memory 517 and an edit sequence 519 token e; and (autoregressively) predicts the next token $\hat{e}_{i+1}$ in the edit sequence 519 based on the maximum likelihood token at the current step.

$$m = \text{encoder}(x)$$

$$\hat{E}_{i+1} = \text{decoder}(m, \hat{e}_i)$$

$$\hat{e}_{i+1} = \arg\max_{w \in W} \hat{E}_{i+1}[w]$$

In some embodiments, teacher forcing is used as the training procedure for the model. Specifically, the second equation above is modified so that the ground truth edit token $e_i$ is input to the decoder 521 to predict a distribution over all possible next edit tokens $\hat{e}_{i+1}$.

$$\hat{E}_{i+1} = \text{decoder}(m, e_i)$$

In some embodiments, the encoder 517 is a pre-trained CodeBert encoder. In some embodiments, the encoder 517 is a pre-trained GraphCodeBert encoder. However, other encoders may be used The decoder 521 architecture is modified from traditional transformer to have two branches—one that predicts edit actions and inserted words, and another that predicts edit locations. In some embodiments, the decoder 521 is a CodeGPT decoder.

In some embodiments, to predict locations the vocabulary of tokens is expanded to support a set number of location tokens and those locations are predicted along with words and actions.

In some embodiments, to predict locations a pointer network branch is used. The pointer network takes the current decoder tensor for the location [LOC] and compares it with every tensor on the encoder side and selects the most similar one, and the similarity computation is usually a dot product. Notice only when the decoder is predicting the [LOC] token, it will call the pointer network, otherwise it follows the normal auto-regressive decoder flow.

Figure 7:
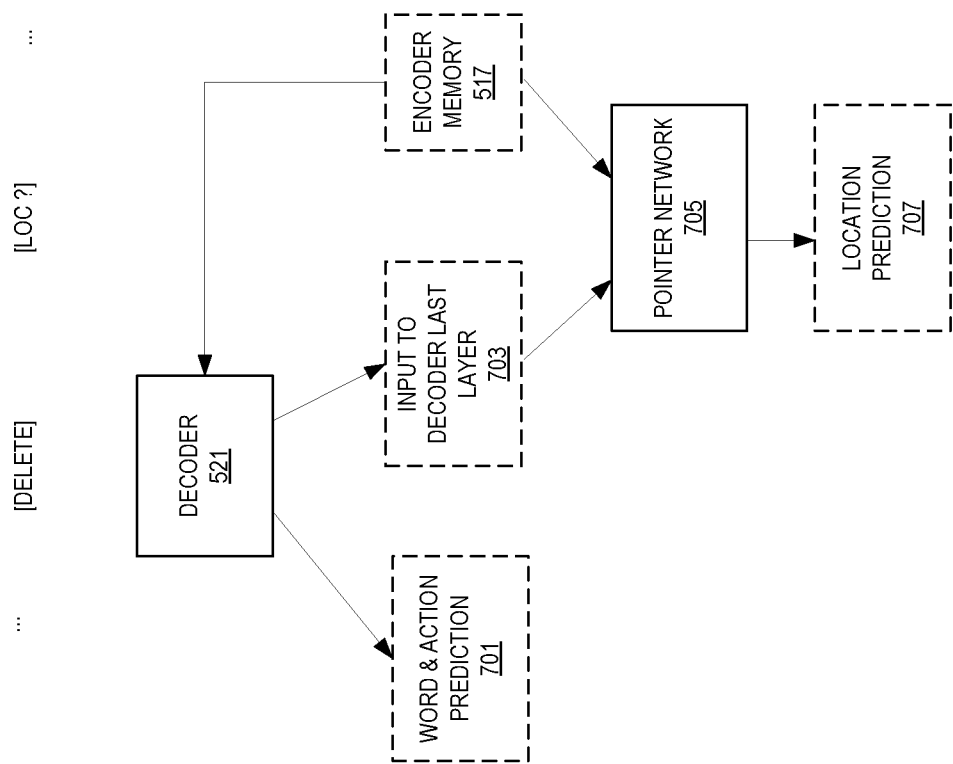
FIG. 7 illustrates the use of a pointer network according to some embodiments

FIG. 7 illustrates the use of a pointer network according to some embodiments. As shown, the last layer of the decoder is replaced with a pointer network 705. The pointer network 705 is a feed forward neural network that transforms the output from the penultimate layer of the decoder 703 into a latent representation v. To determine the location of an edit, A dot product between v and m 517 before a softmax function is performed over all edit locations. The pointer network 705 outputs a probability vector $\hat{L}$ over all edit locations at index 0 . . . L for buggy code with L tokens $$\hat{L} = \frac{\exp(v^T m)}{\sum_{j=0}^{L} \exp(v^T m_j)}$$

Since a ground truth is available with teacher forcing, which branch of decoder to use given the type of ground truth token. For a word and action prediction 701 and a location prediction 707 cross entropy is used.

In some embodiments, the encoder memory 517 is sliced as an embedding m[l] to use as the embedding of a location token <loc l> as the input to the decoder 521. As a result of the pointer network 705, the input m[l] and output v of the decoder for locations are both content-dependent representations, rather than fixed location embeddings.

Figure 8:
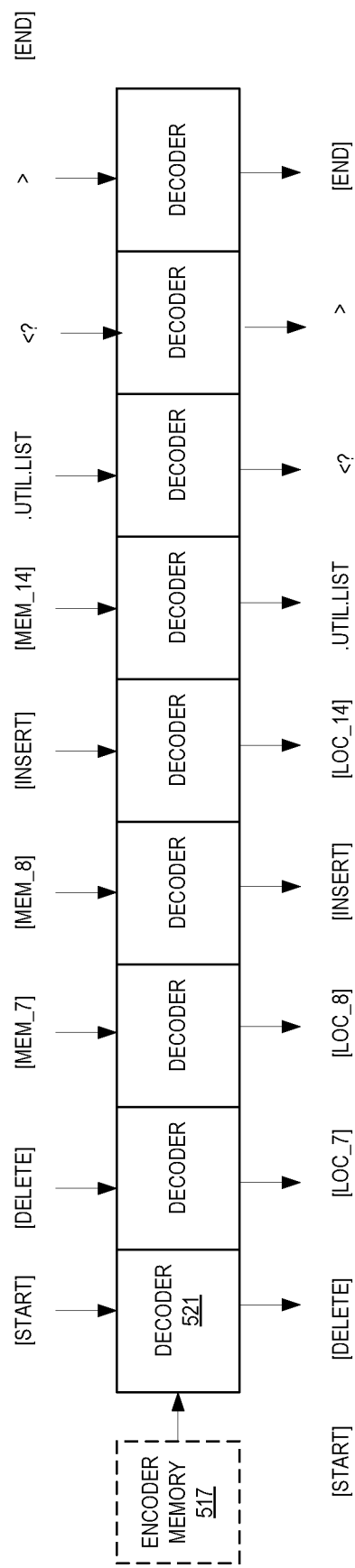
FIG. 8 illustrates embodiments of S2S using a decoder and a pointer network.

FIG. 8 illustrates embodiments of S2S using a decoder and a pointer network. As shown, a one or more memory slices are provided to the decoder after a delete and/or insert and the decoder determines a corresponding location.

Figure 9:
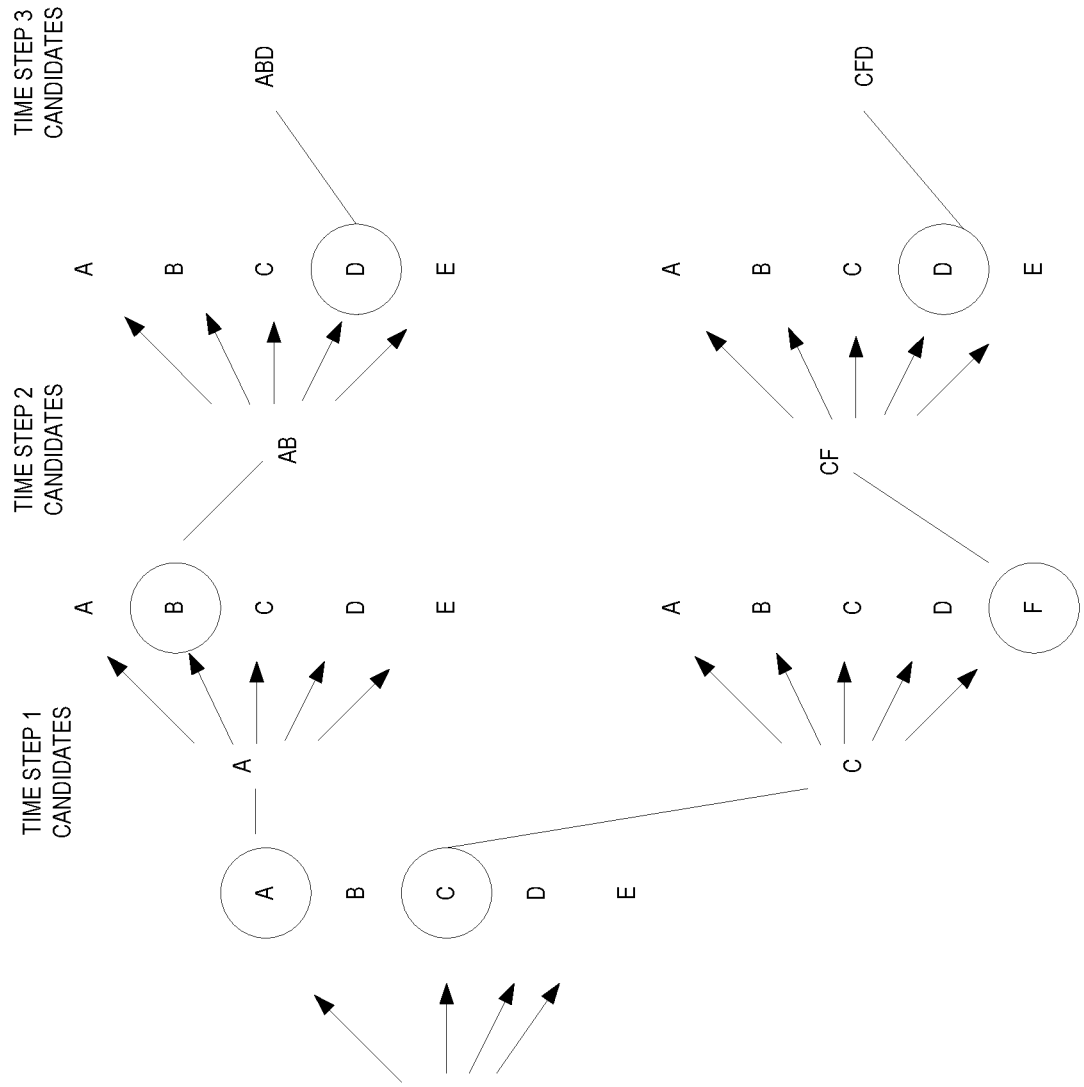
FIG. 9 illustrates an exemplary beam search.

To generate an editing sequence during inference, when the ground truth is not available, in some embodiments, beam search is used. In other embodiments, greedy search is used. FIG. 9 illustrates an exemplary beam search. A beam search is an improved version of a greed search and has a hyperparameter of a beam size K. At the first time step, K tokens with the highest conditional probabilities are selected. At each subsequent time step, based on the K candidate output sequences of the previous time step, another K candidates output sequences are selected. At every step, there are K partial editing sequences, starting from the empty sequence.

In some embodiments, during inference, given a partial editing sequence, NSEDIT predicts the probability for every possible token given the edit grammar accepted by a finite state machine as detailed above, and adds the token with the top-k highest probability to the current partial sequences. This process repeats until the editing sequence is terminated or reaches maximum length. The final K editing sequences are reported. The equation below shows that the finite state machine is used to determine the token type which then determines which decoder branch to use.

$$\hat{E}_{i+1} = \text{decoder}(m, \hat{e}_i, fsm(\hat{e}_i))$$

Each of the editing sequences has a probability associated with it, that is equal to the product of probabilities of all tokens when appended to it. The most probable editing sequence is used as the top-1 prediction, second most as top-2 prediction, and so on.

Without modifying the K editing sequences produced by the beam search, in some embodiments, a reranker is trained to generate a new ordering of the K editing sequences that are not based on the product of probabilities of all tokens in the sequence. To do so, the reranking problem is formulated as a classification problem and train the reranker to identify the correct sequence among the K candidates. In some embodiments, the reranker is a Siamese model. Cross entropy loss is used to train the reranker.

Figure 10:
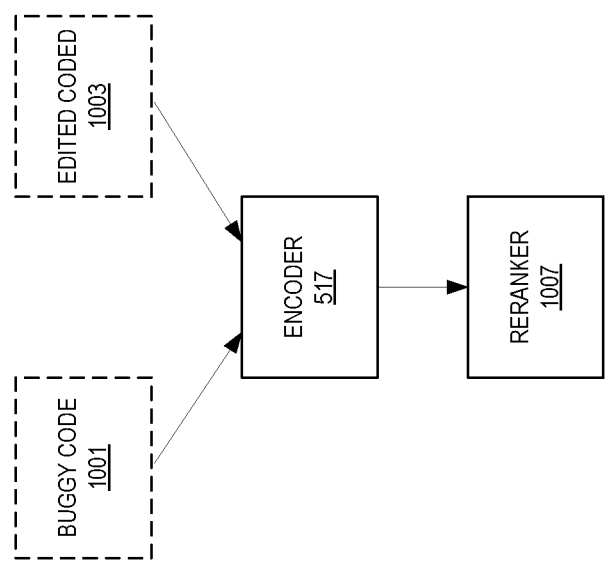
FIG. 10 illustrates embodiments of a reranker architecture

FIG. 10 illustrates embodiments of a reranker architecture. As shown, buggy code 1001 and edited code 1003 (e.g., [CLS]<buggy>[SEP]<edited>[SEP]) is input into the decoder 521. The reranker 1007 then computes a rerank score. Note that multiple suggested (predicted) edits may be provided to a user. The reranker score may also be utilized to determine if a suggested (predicted) edit is adequate to produce. For example, is the rerank score above a set threshold.

Figure 11:
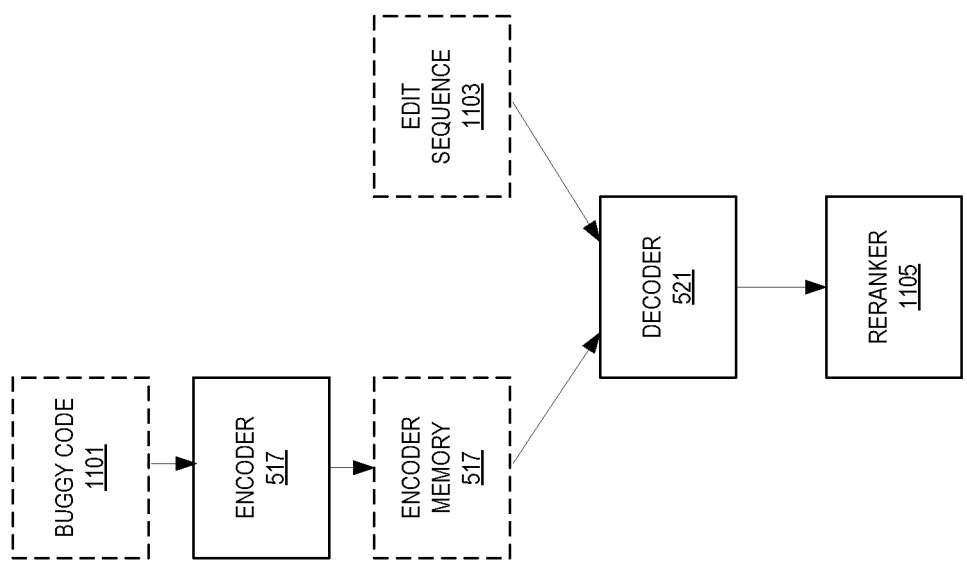
FIG. 11 illustrates embodiments of a reranker architecture

FIG. 11 illustrates embodiments of a reranker architecture. As shown, buggy code 1101 is input into the encoder 517 which produces encoder memory 517. An edit sequence 1103 and the encoder memory 517 is input into the decoder 521. The reranker 1105 then computes a rerank score.

In some embodiments, both reranker architectures are used and an ensemble model blends the ranking score produced by each with the original beam search score to produce the final score.

FIG. 12 is a flow diagram illustrating operations of a method for performing encoder/decoder-based (e.g., transformer-based) bug fixing according to some embodiments. Some or all of the operations (or other processes described herein, or variations, and/or combinations thereof) are performed under the control of one or more computer systems configured with executable instructions, and are implemented as code (e.g., executable instructions, one or more computer programs, or one or more applications) executing collectively on one or more processors. The code is stored on a computer-readable storage medium, for example, in the form of a computer program comprising instructions executable by one or more processors. The computer-readable storage medium is non-transitory. In some embodiments, one or more (or all) of the operations are performed by the code recommendation service of the other figures.

In some embodiments, at 1200 a request to train an encoder or encoder/decoder-based bug fixing model is received. This request includes one or more of an identification of a location of pairs of buggy test code and fixed code, an indication of a beam search size, an indication of the type of encoder or encoder/decoder-based model to use (e.g., the type of encoder and/or decoder to use), an indication of an existing encoder or encoder/decoder-based model to use, an indication of a search strategy to use (e.g., beam, greedy, etc.), an indication of a type of tokenizer to use, etc.

In some embodiments, a encoder or encoder/decoder-based model is trained to perform bug fixing at 1202. This training may have several sub acts. Buggy code and fixed code are tokenized to generate buggy tokens and fixed tokens respectively in some embodiments at 1204.

A encoder or encoder/decoder-based model is fined-tuned to predict an editing sequence using the tokens at 1208. In particular, ground truth edits are found and then teacher forcing is used to train the encoder or encoder/decoder-based model such that the ground truth edit token is input to the decoder to predict a distribution over all possible edit tokens. Note that both branches of the decoder are trained.

In some embodiments, at least one reranker is trained at 1210.

A request to perform encoder or encoder/decoder-based bug fixing is received at 1212. This request includes one or more of code to evaluate for bug fixing, a location of code to evaluate, an identification of a trained encoder or encoder/decoder-based model to use, and an indication of how to provide a result of the bug fixing (e.g., as a difflib style, etc.). Typically the code is unnormalized that it has not before seen before.

Bug fixing inference is performed using the trained encoder or encoder/decoder-based model on the code to evaluate at 1214. As noted above, this may utilize a greedy search, a beam search, a beam search plus finite state machine, and/or any of the previous with reranking.

One or more results of the inference is output at 1216. For example, one change, two changes, etc.

FIG. 13 illustrates an example provider network (or "service provider system") environment according to some embodiments. A provider network 1300 can provide resource virtualization to customers via one or more virtualization services 1310 that allow customers to purchase, rent, or otherwise obtain instances 1312 of virtualized resources, including but not limited to computation and storage resources, implemented on devices within the provider network or networks in one or more data centers. Local Internet Protocol (IP) addresses 1316 can be associated with the resource instances 1312; the local IP addresses are the internal network addresses of the resource instances 1312 on the provider network 1300. In some embodiments, the provider network 1300 can also provide public IP addresses 1314 and/or public IP address ranges (e.g., Internet Protocol version 4 (IPv4) or Internet Protocol version 6 (IPv6) addresses) that customers can obtain from the provider 1300.

Conventionally, the provider network 1300, via the virtualization services 1310, can allow a customer of the service provider (e.g., a customer that operates one or more customer networks 1350A-1350C (or "client networks") including one or more customer device(s) 1352) to dynamically associate at least some public IP addresses 1314 assigned or allocated to the customer with particular resource instances 1312 assigned to the customer. The provider network 1300 can also allow the customer to remap a public IP address 1314, previously mapped to one virtualized computing resource instance 1312 allocated to the customer, to another virtualized computing resource instance 1312 that is also allocated to the customer. Using the virtualized computing resource instances 1312 and public IP addresses 1314 provided by the service provider, a customer of the service provider such as the operator of the customer network(s) 1350A-1350C can, for example, implement customer-specific applications and present the customer's applications on an intermediate network 1340, such as the Internet. Other network entities 1320 on the intermediate network 1340 can then generate traffic to a destination public IP address 1314 published by the customer network(s) 1350A-1350C; the traffic is routed to the service provider data center, and at the data center is routed, via a network substrate, to the local IP address 1316 of the virtualized computing resource instance 1312 currently mapped to the destination public IP address 1314. Similarly, response traffic from the virtualized computing resource instance 1312 can be routed via the network substrate back onto the intermediate network 1340 to the source entity 1320.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and can be mutable within the provider network. Network traffic originating outside the provider network is not directly routed to local IP addresses; instead, the traffic uses public IP addresses that are mapped to the local IP addresses of the resource instances. The provider network can include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses can be assigned by the provider network infrastructure to particular resource instances; these public IP addresses can be referred to as standard public IP addresses, or simply standard IP addresses. In some embodiments, the mapping of a standard IP address to a local IP address of a resource instance is the default launch configuration for all resource instance types.

At least some public IP addresses can be allocated to or obtained by customers of the provider network 1300; a customer can then assign their allocated public IP addresses to particular resource instances allocated to the customer. These public IP addresses can be referred to as customer public IP addresses, or simply customer IP addresses. Instead of being assigned by the provider network 1300 to resource instances as in the case of standard IP addresses, customer IP addresses can be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 14:
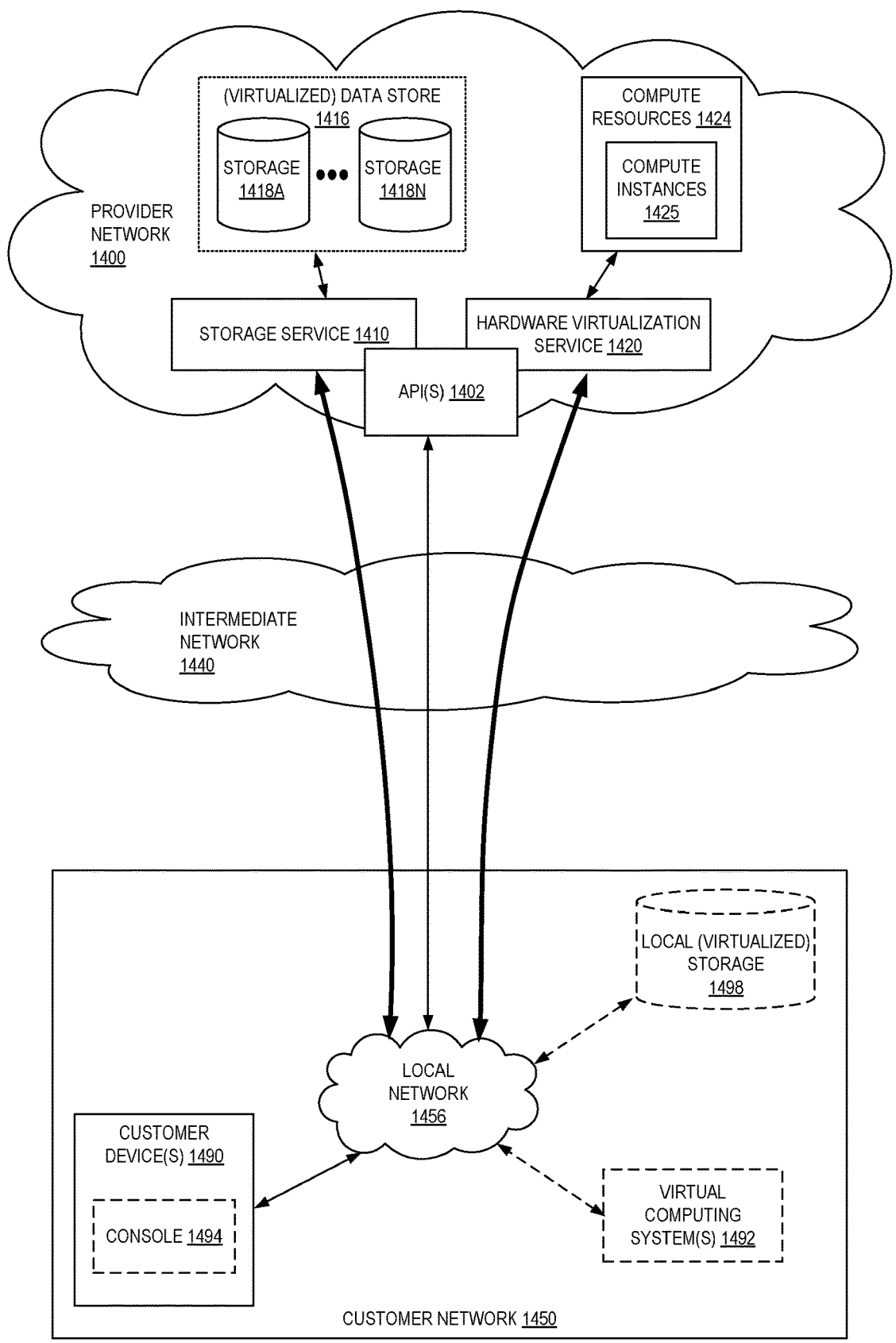
FIG. 14 is a block diagram of an example provider network that provides a storage service and a hardware virtualization service to customers according to some embodiments.

FIG. 14 is a block diagram of an example provider network environment that provides a storage service and a hardware virtualization service to customers, according to some embodiments. A hardware virtualization service 1420 provides multiple compute resources 1424 (e.g., compute instances 1425, such as VMs) to customers. The compute resources 1424 can, for example, be provided as a service to customers of a provider network 1400 (e.g., to a customer that implements a customer network 1450). Each computation resource 1424 can be provided with one or more local IP addresses. The provider network 1400 can be configured to route packets from the local IP addresses of the compute resources 1424 to public Internet destinations, and from public Internet sources to the local IP addresses of the compute resources 1424.

The provider network 1400 can provide the customer network 1450, for example coupled to an intermediate network 1440 via a local network 1456, the ability to implement virtual computing systems 1492 via the hardware virtualization service 1420 coupled to the intermediate network 1440 and to the provider network 1400. In some embodiments, the hardware virtualization service 1420 can provide one or more APIs 1402, for example a web services interface, via which the customer network 1450 can access functionality provided by the hardware virtualization service 1420, for example via a console 1494 (e.g., a web-based application, standalone application, mobile application, etc.) of a customer device 1490. In some embodiments, at the provider network 1400, each virtual computing system 1492 at the customer network 1450 can correspond to a computation resource 1424 that is leased, rented, or otherwise provided to the customer network 1450.

From an instance of the virtual computing system(s) 1492 and/or another customer device 1490 (e.g., via console 1494), the customer can access the functionality of a storage service 1410, for example via the one or more APIs 1402, to access data from and store data to storage resources 1418A-1418N of a virtual data store 1416 (e.g., a folder or "bucket," a virtualized volume, a database, etc.) provided by the provider network 1400. In some embodiments, a virtualized data store gateway (not shown) can be provided at the customer network 1450 that can locally cache at least some data, for example frequently accessed or critical data, and that can communicate with the storage service 1410 via one or more communications channels to upload new or modified data from a local cache so that the primary store of data (the virtualized data store 1416) is maintained. In some embodiments, a user, via the virtual computing system 1492 and/or on another customer device 1490, can mount and access virtual data store 1416 volumes via the storage service 1410 acting as a storage virtualization service, and these volumes can appear to the user as local (virtualized) storage 1498.

While not shown in FIG. 14, the virtualization service(s) can also be accessed from resource instances within the provider network 1400 via the API(s) 1402. For example, a customer, appliance service provider, or other entity can access a virtualization service from within a respective virtual network on the provider network 1400 via the API(s) 1402 to request allocation of one or more resource instances within the virtual network or within another virtual network.

Illustrative Systems

Figure 15:
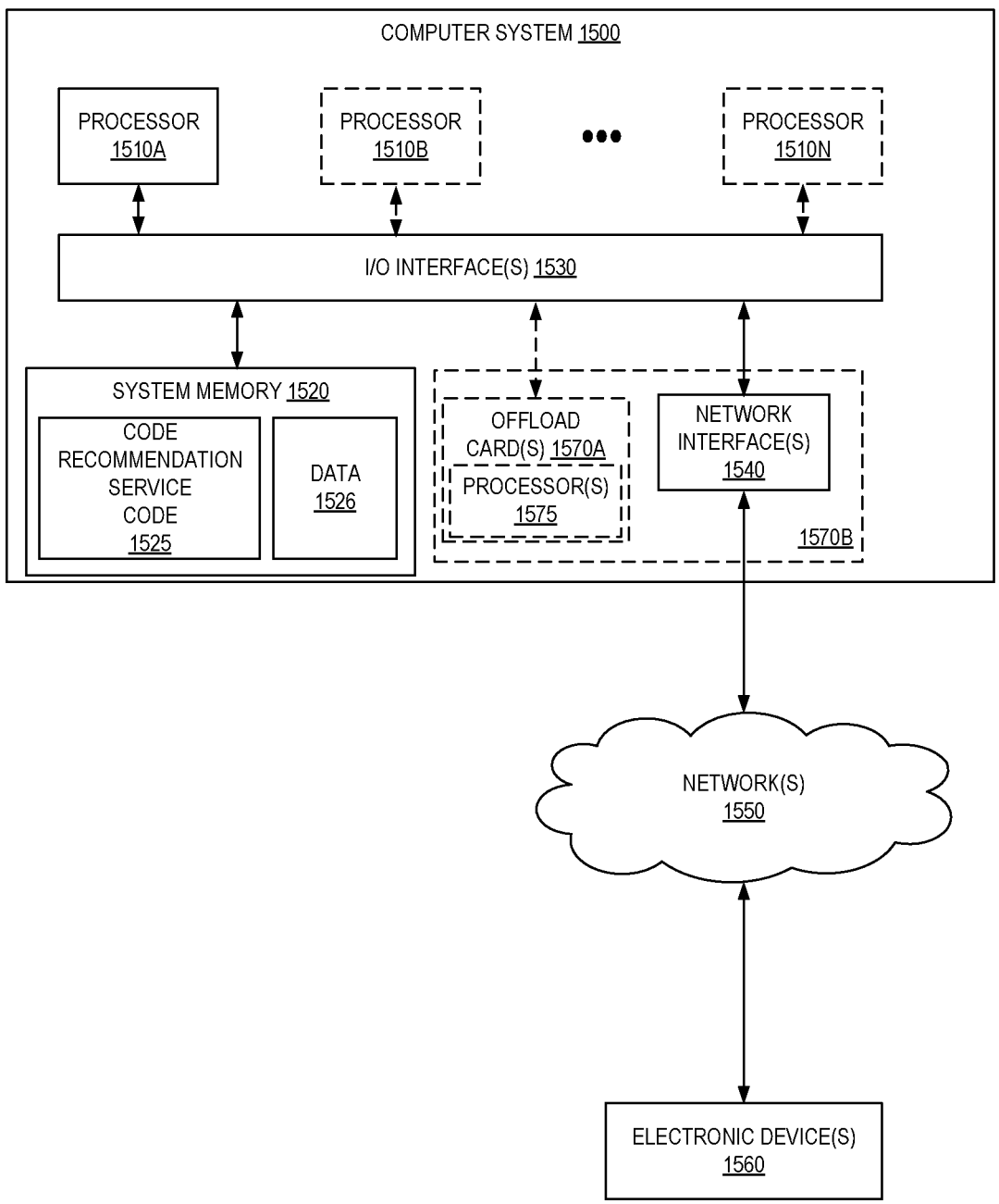
FIG. 15 is a block diagram illustrating an example computer system that can be used in some embodiments.

In some embodiments, a system that implements a portion or all of the techniques described herein can include a general-purpose computer system, such as the computer system 1500 illustrated in FIG. 15, that includes, or is configured to access, one or more computer-accessible media. In the illustrated embodiment, the computer system 1500 includes one or more processors 1510 coupled to a system memory 1520 via an input/output (I/O) interface 1530. The computer system 1500 further includes a network interface 1540 coupled to the I/O interface 1530. While FIG. 15 shows the computer system 1500 as a single computing device, in various embodiments the computer system 1500 can include one computing device or any number of computing devices configured to work together as a single computer system 1500.

In various embodiments, the computer system 1500 can be a uniprocessor system including one processor 1510, or a multiprocessor system including several processors 1510 (e.g., two, four, eight, or another suitable number). The processor(s) 1510 can be any suitable processor(s) capable of executing instructions. For example, in various embodiments, the processor(s) 1510 can be general-purpose or embedded processors implementing any of a variety of instruction set architectures (ISAs), such as the x86, ARM, PowerPC, SPARC, or MIPS ISAs, or any other suitable ISA. In multiprocessor systems, each of the processors 1510 can commonly, but not necessarily, implement the same ISA.

The system memory 1520 can store instructions and data accessible by the processor(s) 1510. In various embodiments, the system memory 1520 can be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within the system memory 1520 as code recommendation service code 1525 (e.g., executable to implement, in whole or in part, the code recommendation service 130) and data 1526.

In some embodiments, the I/O interface 1530 can be configured to coordinate I/O traffic between the processor 1510, the system memory 1520, and any peripheral devices in the device, including the network interface 1540 and/or other peripheral interfaces (not shown). In some embodiments, the I/O interface 1530 can perform any necessary protocol, timing, or other data transformations to convert data signals from one component (e.g., the system memory 1520) into a format suitable for use by another component (e.g., the processor 1510). In some embodiments, the I/O interface 1530 can include support for devices attached through various types of peripheral buses, such as a variant of the Peripheral Component Interconnect (PCI) bus standard or the Universal Serial Bus (USB) standard, for example. In some embodiments, the function of the I/O interface 1530 can be split into two or more separate components, such as a north bridge and a south bridge, for example. Also, in some embodiments, some or all of the functionality of the I/O interface 1530, such as an interface to the system memory 1520, can be incorporated directly into the processor 1510.

The network interface 1540 can be configured to allow data to be exchanged between the computer system 1500 and other devices 1560 attached to a network or networks 1550, such as other computer systems or devices as illustrated in FIG. 1, for example. In various embodiments, the network interface 1540 can support communication via any suitable wired or wireless general data networks, such as types of Ethernet network, for example. Additionally, the network interface 1540 can support communication via telecommunications/telephony networks, such as analog voice networks or digital fiber communications networks, via storage area networks (SANs), such as Fibre Channel SANs, and/or via any other suitable type of network and/or protocol.

In some embodiments, the computer system 1500 includes one or more offload cards 1570A or 1570B (including one or more processors 1575, and possibly including the one or more network interfaces 1540) that are connected using the I/O interface 1530 (e.g., a bus implementing a version of the Peripheral Component Interconnect-Express (PCI-E) standard, or another interconnect such as a Quick-Path interconnect (QPI) or UltraPath interconnect (UPI)). For example, in some embodiments the computer system 1500 can act as a host electronic device (e.g., operating as part of a hardware virtualization service) that hosts compute resources such as compute instances, and the one or more offload cards 1570A or 1570B execute a virtualization manager that can manage compute instances that execute on the host electronic device. As an example, in some embodiments the offload card(s) 1570A or 1570B can perform compute instance management operations, such as pausing and/or un-pausing compute instances, launching and/or terminating compute instances, performing memory transfer/copying operations, etc. These management operations can, in some embodiments, be performed by the offload card(s) 1570A or 1570B in coordination with a hypervisor (e.g., upon a request from a hypervisor) that is executed by the other processors 1510A-1510N of the computer system 1500. However, in some embodiments the virtualization manager implemented by the offload card(s) 1570A or 1570B can accommodate requests from other entities (e.g., from compute instances themselves), and cannot coordinate with (or service) any separate hypervisor.

In some embodiments, the system memory 1520 can be one embodiment of a computer-accessible medium configured to store program instructions and data as described above. However, in other embodiments, program instructions and/or data can be received, sent, or stored upon different types of computer-accessible media. Generally speaking, a computer-accessible medium can include any non-transitory storage media or memory media such as magnetic or optical media, e.g., disk or DVD/CD coupled to the computer system 1500 via the I/O interface 1530. A non-transitory computer-accessible storage medium can also include any volatile or non-volatile media such as RAM (e.g., SDRAM, double data rate (DDR) SDRAM, SRAM, etc.), read only memory (ROM), etc., that can be included in some embodiments of the computer system 1500 as the system memory 1520 or another type of memory. Further, a computer-accessible medium can include transmission media or signals such as electrical, electromagnetic, or digital signals, conveyed via a communication medium such as a network and/or a wireless link, such as can be implemented via the network interface 1540.

Various embodiments discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most embodiments use at least one network that would be familiar to those skilled in the art for supporting communications using any of a variety of widely-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments using a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also can be capable of executing programs or scripts in response requests from user devices, such as by executing one or more Web applications that can be implemented as one or more scripts or programs written in any programming language, such as Java®, C, C# or C++, or any scripting language, such as Perl, Python, PHP, or TCL, as well as combinations thereof. The server(s) can also include database servers, including without limitation those commercially available from Oracle®, Microsoft®, Sybase®, IBM®, etc. The database servers can be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of embodiments, the information can reside in a storage-area network (SAN) familiar to those skilled in the art. Similarly, any necessary files for performing the functions attributed to the computers, servers, or other network devices can be stored locally and/or remotely, as appropriate. Where a system includes computerized devices, each such device can include hardware elements that can be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system can also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments can have numerous variations from that described above. For example, customized hardware might also be used and/or particular elements might be implemented in hardware, software (including portable software, such as applets), or both. Further, connection to other computing devices such as network input/output devices can be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments can be practiced without the specific details. Furthermore, well-known features can be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters can be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters might or might not have the same number of instances in various embodiments.

References to "one embodiment," "an embodiment," "an example embodiment," etc., indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). Similarly, language such as "at least one or more of A, B, and C" (or "one or more of A, B, and C") is intended to be understood to mean A, B, or C, or any combination thereof (e.g., A, B, and/or C). As such, disjunctive language is not intended to, nor should it be understood to, imply that a given embodiment requires at least one of A, at least one of B, and at least one of C to each be present.

Unless otherwise explicitly stated, articles such as "a" or "an" should generally be interpreted to include one or multiple described items. Accordingly, phrases such as "a device configured to" or "a computing device" are intended to include one or multiple recited devices. Such one or more recited devices can be collectively configured to carry out the stated operations. For example, "a processor configured to carry out operations A, B, and C" can include a first processor configured to carry out operation A working in conjunction with a second processor configured to carry out operations B and C.

The specification and drawings are, accordingly, to be regarded in an illustrative rather than a restrictive sense. It will, however, be evident that various modifications and changes can be made thereunto without departing from the broader spirit and scope of the disclosure as set forth in the claims.

What is claimed is:

1. A computer-implemented method comprising:
receiving a request to perform transformer-based bug fixing on code;
performing bug fixing inference on the code by applying a transformer model, wherein the transformer model includes an encoder to generate an encoder memory from tokens from the code and a decoder to predict a next token in an editing sequence, wherein the decoder includes a selectable first branch to predict edit actions and inserted words and a selectable second branch that uses a pointer network to predict edit locations based at least partially on the encoder memory generated by the encoder of the transformer model, wherein the bug fixing inference is performed using a beam search over output of the encoder, and wherein the beam search uses a finite state machine to determine a branch of the decoder to use; and
reporting out a result of the bug fixing inference, wherein the result includes an indication of a location of a potential edit to be made in the code and the potential edit to be made in the code.

2. The computer-implemented method of claim 1, further comprising reranking output of the beam search using a trained reranker to generate a new ordering of editing sequences.

3. A computer-implemented method comprising:
receiving a request to perform encoder/decoder-based bug fixing on code;
performing bug fixing inference on the code by applying a trained encoder/decoder-based model, wherein the model includes an encoder to generate an encoder memory from tokens from the code and a decoder to predict a next token in an editing sequence, wherein the decoder includes a selectable first branch to predict edit actions and inserted words and a selectable second branch to predict edit locations based at least partially on the encoder memory generated by the encoder of the model, wherein the bug fixing inference is performed using a beam search over output of the encoder, and wherein the beam search uses a finite state machine to determine a branch of the decoder to use; and
reporting out a result of the bug fixing inference, wherein the result includes an indication of a location of a potential edit to be made in the code and the potential edit to be made in the code.

4. The computer-implemented method of claim 3, further comprising reranking output of the model to select one or more hypotheses produced by the beam search using a reranker.

5. The computer-implemented method of claim 4, wherein the reranker is fed output of the encoder that has been fed edited code and buggy code.

6. The computer-implemented method of claim 4, wherein the reranker is fed output of the decoder that has been fed an edit sequence and the encoder memory.

7. The computer-implemented method of claim 4, wherein the reranking comprises reranking the output of the model using an ensemble model that blends a plurality of reranker outputs.

8. The computer-implemented method of claim 4, wherein the reranker determines if a predicted edit is adequate to produce as an output based on a comparison to a threshold.

9. The computer-implemented method of claim 3, wherein the finite state machine uses a grammar that includes delete and insert actions, and wherein a delete action deletes an indexed subsequence and an insert action inserts a sequence of tokens.

10. The computer-implemented method of claim 3, wherein the second branch uses a pointer network to predict the edit locations.

11. The computer-implemented method of claim 3, further comprising tokenizing the code prior to applying the model.

12. The computer-implemented method of claim 3, wherein the request to perform transformer-based bug fixing on code includes one or more of the code to evaluate for bug fixing, a location of the code to evaluate, or an indication of how to provide the result of the bug fixing inference.

13. The computer-implemented method of claim 3, wherein the code to evaluate is unnormalized code.

14. A system comprising:
a first one or more electronic devices to implement a code repository service in a multi-tenant provider network; and
a second one or more electronic devices to implement a code recommendation service in the multi-tenant provider network, the code recommendation service including instructions that upon execution by one or more processors cause the code recommendation service to:
receive a request to perform transformer-based bug fixing on code stored in the code repository service;
on the code by applying a trained encoder/decoder-based model, wherein the model includes an encoder to generate an encoder memory from tokens from the code and a decoder to predict a next token in an editing sequence, wherein the decoder includes a selectable first branch to predict edit actions and inserted words and a selectable second branch to predict edit locations based at least partially on the encoder memory generated by the encoder of the model, wherein the bug fixing inference is performed using a beam search over output of the encoder, and wherein the beam search uses a finite state machine to determine a branch of the decoder to use; and
report out a result of the bug fixing inference, wherein the result includes an indication of a location of a potential edit to be made in the code and the potential edit to be made in the code.

15. The system of claim 14, wherein the request to perform transformer-based bug fixing on code includes one or more of the code to evaluate for bug fixing, a location of the code to evaluate, or an indication of how to provide the result of the bug fixing inference.

16. The system of claim 14, wherein the code recommendation service is further to rerank output of the model to select one or more hypotheses produced by the beam search using a reranker.

17. The system of claim 16, wherein the reranker is fed output of the encoder that has been fed edited code and buggy code.

18. The system of claim 16, wherein the reranker is fed output of the decoder that has been fed an edit sequence and the encoder memory.

19. The system of claim 16, wherein the reranking comprises reranking the output of the model using an ensemble model that blends a plurality of reranker outputs.

20. The system of claim 16, wherein the reranker determines if a predicted edit is adequate to produce as an output based on a comparison to a threshold.

* * * * *